United States Patent [19]

Sekiguchi

[11] 4,123,777
[45] Oct. 31, 1978

[54] COLOR TELEVISION CAMERA HAVING AN AUXILIARY ILLUMINATION SOURCE

[75] Inventor: Takeshi Sekiguchi, Tokyo, Japan

[73] Assignee: Canon Kabushiki Kaisha, Tokyo, Japan

[21] Appl. No.: 782,022

[22] Filed: Mar. 28, 1977

[30] Foreign Application Priority Data

Mar. 20, 1976 [JP] Japan .................................. 51/38236

[51] Int. Cl.² ............................................. H04N 9/04
[52] U.S. Cl. .......................................... 358/55; 358/50
[58] Field of Search ................................... 358/55, 50

[56] References Cited
U.S. PATENT DOCUMENTS 3,739,080  6/1973  Bachmann ............................. 358/55

Primary Examiner—Richard Murray
Attorney, Agent, or Firm—Toren, McGeady and Stanger

[57] ABSTRACT

A color television camera having an auxiliary illumination source. This color television camera has a color separation prism of plural blocks of prisms. The incidence prism of this color separation prism has two recesses, namely, the first and the second. In the first recess, an auxiliary illumination source is positioned. A part of the light coming from this source is directed to the image pickup tube after being transmitted to the surface which forms the first recess. Another part of the light coming from this source is directed to the second recess after being transmitted to the surface which forms the first recess. The light which goes to the second recess is re-directed to the image pickup tube after being reflected from the surface of the second recess.

6 Claims, 4 Drawing Figures

COLOR TELEVISION CAMERA HAVING AN AUXILIARY ILLUMINATION SOURCE

BACKGROUND OF THE INVENTION

Field of the Invention

This invention relates to a color television camera in which the image pickup tube is illuminated by an auxiliary illumination source or a bias light source to eliminate the residual image.

This television camera is classified into two types by the position of the auxiliary illumination source: the first type, in which the auxiliary illumination source is positioned in front of the incidence surface of the color separation prism, and the second type, in which the auxiliary illumination source is positioned behind the incidence of the color separation prism. As the typical example of the first type, there is a television camera described in U.S. Pat. No. 3,767,846. The television camera of this U.S. patent has an auxiliary light source device including the light guide rod arranged between the objective lens and a color separation prism. The light coming from this light source device illuminates the image pickup tube by illuminating the incidence surface of the color separation prism.

As the second type, there is a television camera described in U.S. Pat. No. 3,610,818. This television camera has a light source arranged behind the incidence surface of the prism. The light coming from the light source is transmitted through the sub-prism cemented on the color separation prism and enters the color separation prism, and after being reflected by a dichroic layer and total reflecting surfaces, the light illuminates the image pickup tube. However, in this television camera, since the auxiliary illuminating light enters the image pickup tube at a definite angle, this television camera has a fault that the amount of illuminating light is not constant.

In the U.S. Pat. No. 3,824,004, a television camera free from the above-mentioned fault is shown. In this U.S. patent, this television camera has a sub-prism cemented with the color separation prism, and in which a part of the light coming from the auxiliary light source and transmitted through the incidence surface of this sub-prism is directed to the image pickup tube by the reflecting surface of the sub-prism and a mirror positioned on the incidence surface of the color separation prism. The other part of the light is directed to said image pickup tube by being reflected on the tilted mirror facing to the incident surface of said sub-prism. In this camera, the incident angles of the two auxiliary illuminating light beams are symmetrical to each other with respect to the normal axis of the surface of the image pickup tube. Accordingly the above-mentioned fault that the amount of illuminating light is not constant is removed. However, this television camera has a complicated construction with use of a sub-prism. Then, this television camera has the fault that the article costs high.

SUMMARY OF THE INVENTION

Therefore, the object of the present invention is to provide a color television camera of simple construction having an auxiliary illumination source.

This object can be attained by providing two recesses, namely the first and the second, on the incidence prism of a color separation prism, inserting the light source device into the first recess, and forming the reflecting surface on the second recess. By such a construction, a part of the light coming from the light source is directly directed to the image pickup tube after being transmitted through the surface which forms the first recess, and another part of the light is directed to the image pickup tube after being transmitted through the surface which forms the first recess and reflected by the reflecting surface which forms the second recess.

BRIEF DESCRIPTION OF THE INVENTION

DESCRIPTION OF THE PREFERRED EMBODIMENT

Figure 1:
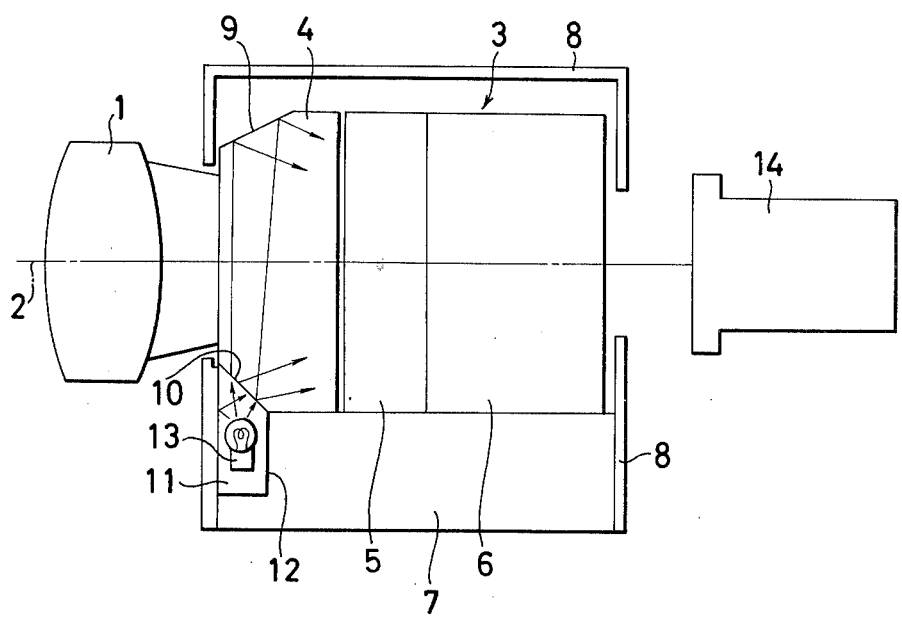
FIG. 1 is a view illustrating an embodiment of the present invention.

FIG. 1 is a view illustrating the first embodiment of this invention. In the drawings, 1 is an objective lens, and 2 is an optical axis of the camera, and this optical axis 2 corresponds to an optical axis of the lens 1. 3 is a color separation prism. This color separation prism is the same as that shown in U.S. Pat. No. 3,202,037. But, this color separation prism is not restricted by the U.S. patent, and it may be any color separation prism, such as described, for example, in U.S. Pat. No. 3,798,354. 4, 5 and 6 are a prism of incidence, a middle prism, and an exit prism, and these form the color separation prism. This color separation prism is fixed to a casing 8 by a supporting plate 7. 9 and 10 are recesses provided on the incidence prism 4 facing with respect to said optical axis 2. These recesses 9 and 10 are formed on the outside of the light path of the image forming light of the objective lens 1. And, these recesses 9 and 10 may be adjacent the incidence surface of the incidence prism. 11 is a light source unit. This light source unit 11 has a tube 12, the inside surface of which is a metallic reflecting surface of white paint surface, and a lamp 13. This light source unit 11 is inserted in the first recess 10 and fixed on the casing 8. The second recess 9 has a polished reflecting surface or a diffusing mat surface. 14 is an image pickup tube. The television camera is provided with further two image pickup tubes (not shown) other than the tube 14.

Referring to the first embodiment, the light coming from the objective lens 1 enters the color separation prism 3 through the incidence opening of the casing 8. This incident light is never eclipsed by the recesses 9 and 10. The incident light is separated into three component color lights which are emitted through three exit openings of the casing respectively. Each of three component color lights forms a component color image on each of the three camera tubes. On the other hand, a light coming from the light source unit 11 enters the prism 3 through the surface of the first recess 10. A part of the light entering such prism is emitted through the exit surfaces of the color separation prism. The emitted light illuminates the camera tubes. The other part of light entering such prism is directed to the second recess 9 and is reflected by the surface of the recess 9 and emitted through the exit surfaces of color separation prism. The light emitted through said exit surface illuminates the camera tubes.

In this embodiment, the image pickup tube is illuminated by two light beams from the symmetrical direction with respect to the optical axis, so that the quantity of illuminating light given to the image pickup tube is always constant.

Figure 2:
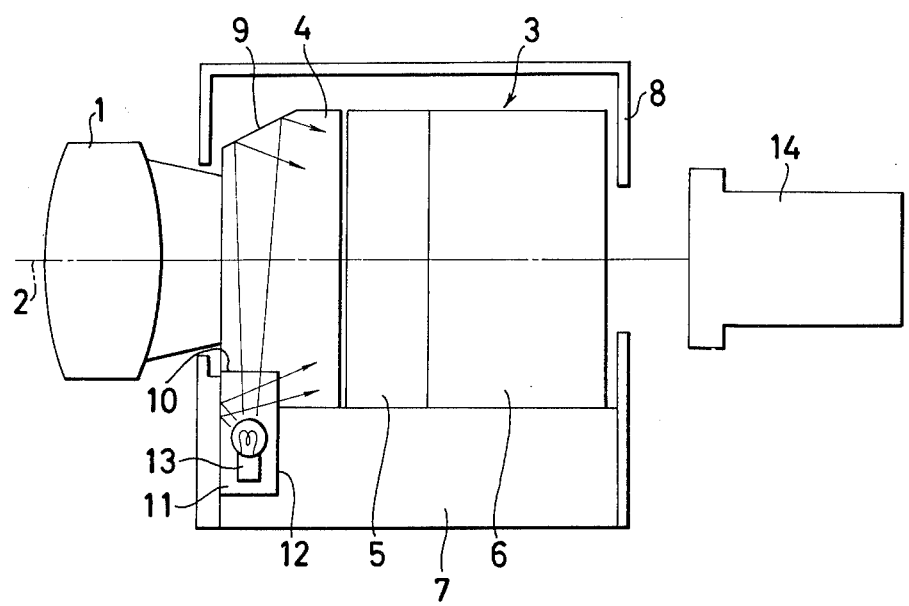
FIG. 2 is a view illustrating the second embodiment of this invention.

FIG. 2 is a view illustrating the second embodiment of this invention.

Figure 3:
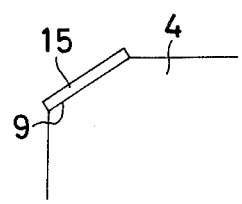
FIG. 3 is a partially magnified view of the second embodiment of this invention.

In the first embodiment, the recess 10 is formed by one incline surface, but in this embodiment, it is formed by two surfaces. On the surface having the recess 9, the reflecting means 15, such as the metallic reflecting layer or the white paint layer as described in FIG. 3 is provided. With these exceptions, FIG. 2 is the same as FIG. 1.

Further, referring to the embodiments of FIG. 1 and FIG. 2, the quantity and wavelength distribution of the auxiliary illumination light is able to be adjusted according to the characters of image pickup tube used by arranging a light amount compensating filter such as an ND-filter or a color filter so as to decrease the light amount or specific wavelength sphere between the light source and the recess 10.

Figure 4:
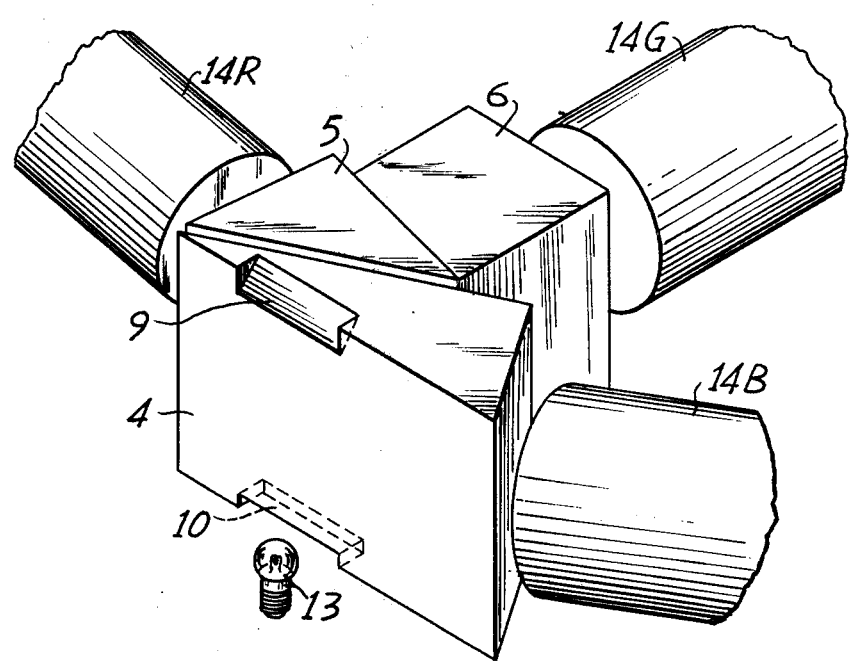
FIG. 4 is an oblique view of a portion of FIG. 2 showing the three pick-up camera tubes.

FIG. 4 illustrates an oblique view of the arrangement of FIG. 2 excluding the lens 1, the casing 8 and the lamp housing 12. The three pick-up camera tubes are shown as 14B, 14G, 14R in FIG. 4.

What is claimed is:

1. A color television camera having an auxiliary illumination source, which comprises
    an objective lens;
    a color separation prism receiving a light from said objective lens and providing a plurality of component color beams, said color separation prism including a plurality of prism blocks and an incidence prism within the plurality of the prism blocks and being provided with a first and a second recesses;
    an auxiliary illumination device arranged on the first recess of said color separation prism; and
    plural image pickup tubes on which said color component images are formed;
    whereby the light coming from said auxiliary illumination device enters said color separation prism through the surface having the first recess, and a part of the light entering said color separation prism is directed to said second recess and reflected by the surface having the second recess, emitted through the exit surfaces of said color separation prism, and directed to the image pickup tubes, and the other part of light entering said color separation prism is directed to said image pickup tubes after being emitted through the exit surfaces of said color separation prism.

2. A color television camera having an auxiliary illumination source according to claim 1, in which said surface of the second recess is a totally reflecting surface.

3. A color television camera having an auxiliary illumination source according to claim 1, in which said surface of said second recess is a diffusing mat surface.

4. A color television camera having an auxiliary illumination source according to claim 1, in which said surface of said second recess is covered with a reflective layer.

5. A color television camera having an auxiliary illumination source according to claim 1, in which said auxiliary illumination device has a tube and a light source.

6. A color television camera having an auxiliary illumination source according to claim 5, in which the inside of said tube is a reflecting surface.

* * * * *

UNITED STATES PATENT OFFICE
CERTIFICATE OF CORRECTION

Patent No. 4,123,777  Dated October 31, 1978

Inventor(s) Takeshi Sekiguchi

It is certified that error appears in the above-identified patent and that said Letters Patent are hereby corrected as shown below:

In the heading of the Patent [30] should read as follows

[30]  Foreign Application Priority Data

Mar. 30, 1976 [JP]    Japan................51/38236

Signed and Sealed this

Thirtieth Day of January 1979

[SEAL]

Attest:

RUTH C. MASON
Attesting Officer

DONALD W. BANNER
Commissioner of Patents and Trademarks